Oct. 21, 1924.  
F. B. CROCKER  
1,512,409  
METHOD AND APPARATUS FOR TESTING FLYING MACHINES  
Filed April 8, 1921
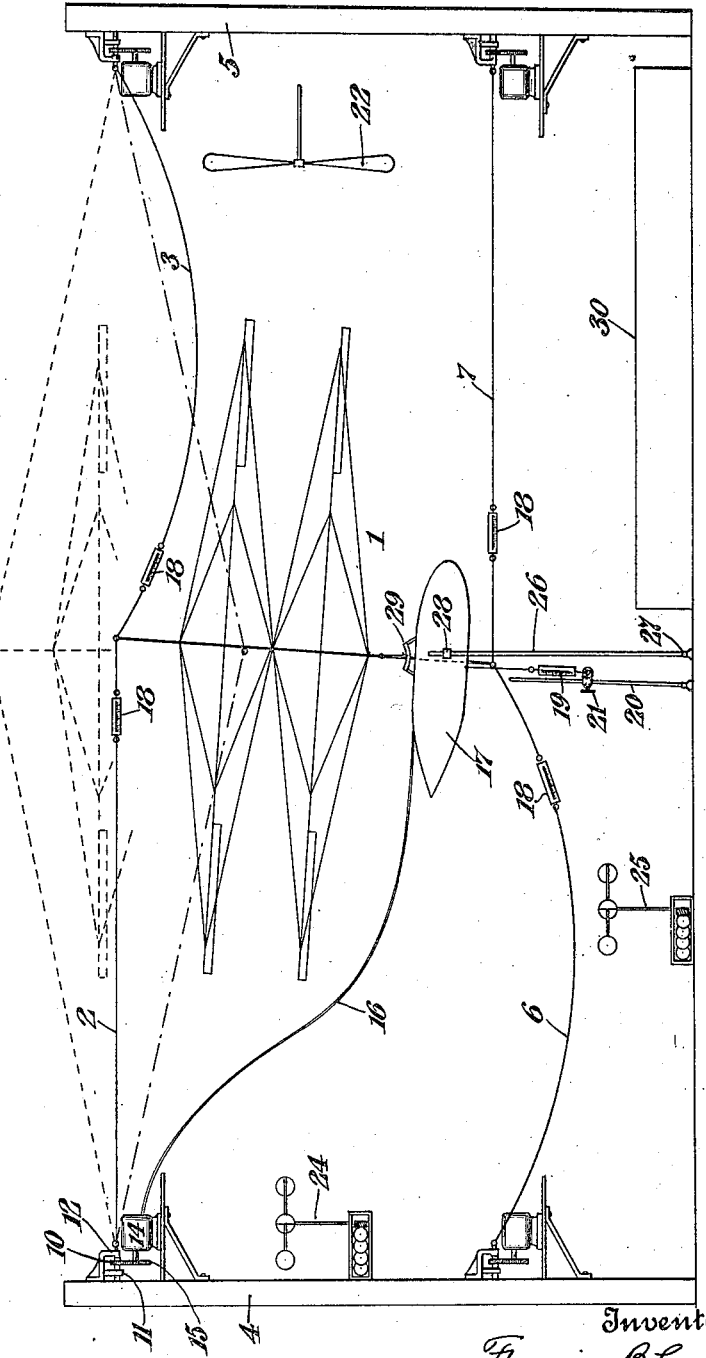
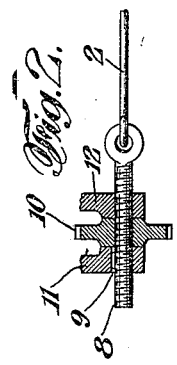
Inventor  
Francis B. Crocker  
By his Attorneys  
Kenyon & Kenyon Patented Oct. 21, 1924.

1,512,409

UNITED STATES PATENT OFFICE.

FRANCIS B. CROCKER, OF NEW YORK, N. Y.

METHOD AND APPARATUS FOR TESTING FLYING MACHINES.

Application filed April 8, 1921. Serial No. 459,529.

*To all whom it may concern:*

Be it known that I, FRANCIS B. CROCKER, a citizen of the United States, and a resident of New York, in the county of New York and State of New York, have invented certain new and useful Improvements in Methods and Apparatus for Testing Flying Machines, of which the following is a specification.

My invention relates to a method and apparatus for testing flying machines, and more particularly helicopters. The principal object of my invention is to permit actual trial or test of such machines under conditions of actual flight without the dangers, both to the machine and its occupant, which are generally incident to flight.

Another object is to provide a method and apparatus whereby the art of flying a helicopter or like machines may be learned in safety under conditions of actual flight.

Other objects, features and advantages will appear more fully in the following detailed description and appended claims.

The accompanying drawing forming a part of this specification illustrates one form of apparatus embodying my invention and adapted to be used in carrying out my improved method.

In the drawing,

Fig. 1 is an elevation of the apparatus; and

Fig. 2 is a sectional view of a detail of construction.

Referring to the drawing, a helicopter 1 has secured to its upper portion the inner ends of upper stays, preferably flexible wire rope guys 2 and 3, the outer ends of which are secured to uprights, such as the posts 4 and 5. Other stays 6 and 7, preferably also wire rope guys, are secured at their inner ends to the lower portion of the helicopter and at their outer ends to the uprights 4 and 5. There may be allowed sufficient slack in the guys 2, 3, 6 and 7 to permit a limited amount of movement of the helicopter up and down and also laterally, that is, at an angle to the vertical; so that the helicopter may rise and descend as in actual flight to a limited extent and may also be tilted so as to assume the usual proper position corresponding to horizontal movement.

It is desirable, however, in performing certain kinds of tests, to have the guys substantially taut; and my invention includes means whereby the amount of slack in the guys may be adjusted or varied with facility. The guys have, as shown in Fig. 2, threaded end members 8 which are adapted to move longitudinally in their supports but are held against rotation by suitable means such as splines 9 coacting with longitudinal grooves in the respective members 8. As shown, a gear 10, which is held against axial movement by the arms 11 and 12 of a supporting bracket secured to an upright, is threaded upon the member 8. By rotation of the gear 10 the member 8 will be moved longitudinally to vary the slack in the corresponding guy. For rotating the gear 10 I have shown an electric motor 14, the shaft of which is provided with gear 15 meshing with the gear 10. The controlling means for the motor may be connected thereto as by a conductor containing a cable 16, so that the starting and stopping of the motor may be controlled by the operator of the helicopter from the fuselage 17 thereof. Each of the guys, as shown, is provided with such means for adjusting the length thereof.

In testing the apparatus it is desirable to know the force with which the helicopter tends to rise and also the force with which it tends to move laterally. For determining these forces I provide suitable means, such as spring balances 18 and 19 preferably of very moderate extensibility. A balance 18, as shown, is secured to each of the guys 2, 3, 6 and 7 so as to permit ready measurement of the force tending to move the helicopter horizontally. The balance 19 is, as shown, detachably secured to a member 20 which may be a rod anchored to the ground at its lower end and detachably connected as by a clamp 21 attached to the lower portion of the balance at whatever vertical position the helicopter may be. Whenever it is not desired to measure the lifting force of the helicopter, the member 20 may be disconnected from the balance by means of the clamp 21.

Desirably the apparatus will be positioned so that the usual atmospheric currents may be allowed to strike the flying machine or be shielded from it by screens. For facilitating testing I provide means such as the fan 22 for producing air currents artificially. The fan 22, as shown, produces a lateral or side current of air on the machine. Means are desirably provided whereby the air currents may be measured, In the drawings the anemometer 24 is arranged to measure the speed or force of side currents of air from or upon the helicopter and the anemometer 25 to measure the speed or force of the down draft from the helicopter.

Among the advantages of a helicopter is the ability to hover or remain substantially stationary in the air. To determine and indicate to the operator whether there is any vertical movement of the machine, and if so how much, during the testing or trial thereof, I provide means such as the graduated measuring rod 26 which, as shown, is secured to the ground by universal joint 27 and slides loosely through a collar 28 upon the fuselage 17. The vertical position of the flying machine can be observed by noting the graduations on the measuring rod in connection with the sleeve 28. The latter fits upon the rod 26 sufficiently loosely to permit the desired movement of the helicopter.

I also provide an indicator 29 for measuring the angle of tilt of the helicopter.

In practice, the helicopter having been secured to the slackened guys 2, 3, 6 and 7, with the member 20 detached from the helicopter, the latter is free to move vertically a limited extent. In Fig. 1 the helicopter is shown in solid lines in its intermediate position and (in part) in dotted lines in its upper position. The upper guys are shown in dot and dash lines in their lower position. In its lower position, as shown, the helicopter rests upon platform scales 30 for weighing the same and such live or dead weight as may be carried thereby. It will be seen that the helicopter is always held by the flexible members 2, 3, 6 and 7 against upsetting, that is, in the form of apparatus shown, it is always retained in a substantially upright position. The helicopter may be tilted to the position corresponding to horizontal flight by any suitable means such as is shown in application of Peter Cooper Hewitt, Ser. No. 304,190, filed June 14, 1919; and the angle of tilt may be varied by adjusting the effective length of the guys. By control of the motors of the helicopter the latter may be caused to move either up or down; and inasmuch as it is free to move laterally to a limited extent, tests under substantially the conditions of actual flight may be made. A beginner can be left to learn the art of flying a machine without any danger and suitable side currents may be produced artificially so that he may gain experience under varying atmospheric conditions. The operator of the machine may control the permissible amount of movement of the machine by varying the slack in the guys so that as successful flight is learned the amount of permissible movement may be increased. In testing the apparatus the amount of force tending to move the machine laterally and vertically may be determined from the balances 18 and 19 respectively, the guys being desirably substantially taut. The air currents, in whatever way produced, are measured by the anemometers 24 and 25.

The uprights 4 and 5 need not be of great height but they may, if desired, be made of considerable height so as to insure freedom from the effect of the ground below upon the air currents. While only two uprights at opposite sides of the helicopter are shown, a greater number thereof with stays therefor may be provided.

Many modifications other than those described above may be made without departing from the spirit of my invention.

Having thus described my invention, what I claim as new and desire to secure by Letters Patent is:

1. The method of testing a helicopter, which consists in supporting the helicopter to permit only limited lateral and up and down movement thereof, operating the same while so supported, and measuring the air current from the helicopter during the operation thereof.

2. The method of testing a helicopter, which consists in supporting the helicopter to permit only limited lateral and up and down movement thereof, directing an air current on the helicopter, operating the same while so supported and measuring the force tending to move the helicopter.

3. Apparatus for testing a helicopter comprising supporting means therefor arranged to prevent upsetting thereof and adapted to permit limited tilting and up and down movement thereof.

4. Apparatus for testing a flying machine, such as a helicopter, comprising fixed uprights on different sides of the flying machine and upper and lower flexible members secured to each of said uprights and adapted to be secured to the flying machine to hold the same upright while permitting limited up and down and lateral movement thereof.

5. Apparatus for testing a flying machine, such as a helicopter, comprising flexible means normally fixed at one point and adapted to be connected with a slack therein at another point to the flying machine, and means for varying the effective length of such flexible means at the normally fixed point thereof, said means including controlling means accessible to an occupant of the machine.

6. Apparatus for testing a flying machine, such as a helicopter, comprising flexible members each normally fixed at one point and adapted to be secured at another point to the flying machine, and means for varying the effective length of such member at the normally fixed points thereof, said means including a motor and controlling means for the motor accessible to the occupant of the machine.

7. Apparatus for testing a flying machine, such as a helicopter, comprising flexible members each fixed at one point and adapted to be secured at another point to the flying machine, and means including a motor for varying the effective length of such members.

8. Apparatus for testing a helicopter comprising supporting means therefor arranged to permit only limited tilting and up and down movement thereof, and means for measuring the force tending to move the helicopter.

9. Apparatus for testing a helicopter comprising supporting means therefor arranged to permit only limited tilting and up and down movement thereof, and means for measuring the force tending to move the helicopter laterally.

10. Apparatus for testing a helicopter comprising supporting means therefor arranged to permit limited tilting and up and down movement thereof, and means for measuring the lifting force of the helicopter.

11. Apparatus for testing a flying machine, such as a helicopter, comprising flexible members having a slack therein and each fixed at one point and adapted to be secured at another point to the flying machine to hold the same against upsetting while permitting limited up and down and lateral movement thereof, and means for measuring the tension produced in any of said members by the flying machine.

12. Apparatus for testing a helicopter comprising anchoring means therefor arranged to prevent upsetting thereof and adapted to permit limited tilting and up and down movement thereof, and means for measuring the air currents adjacent the helicopter.

13. Apparatus for testing a helicopter comprising supporting means therefor arranged to permit only limited tilting and up and down movement thereof, and means for directing air currents on the helicopter.

14. Apparatus for testing a helicopter comprising supporting means therefor arranged to permit only limited tilting and up and down movement thereof, and means for indicating variations in elevation of the helicopter.

15. Apparatus for testing a helicopter comprising supporting means therefor arranged to prevent upsetting thereof and adapted to permit limited tilting and up and down movement thereof, and means for indicating variations in the vertical position and tilt of the helicopter.

16. Apparatus for testing a helicopter comprising supporting means therefor arranged to prevent upsetting thereof and adapted to permit limited tilting and up and down movement thereof, and means for indicating variations in the tilt of the helicopter.

17. Apparatus for testing a helicopter comprising supporting means therefor arranged to prevent upsetting thereof and adapted to permit limited tilting and up and down movement thereof, and means for weighing the helicopter.

In testimony whereof, I have signed my name to this specification.

FRANCIS B. CROCKER.